Nov. 15, 1966  T. W. SPONG  3,286,056
INSTANTANEOUS DECELERATION SIGNAL
SWITCH FOR AUTOMOTIVE VEHICLES
Filed Nov. 20, 1964
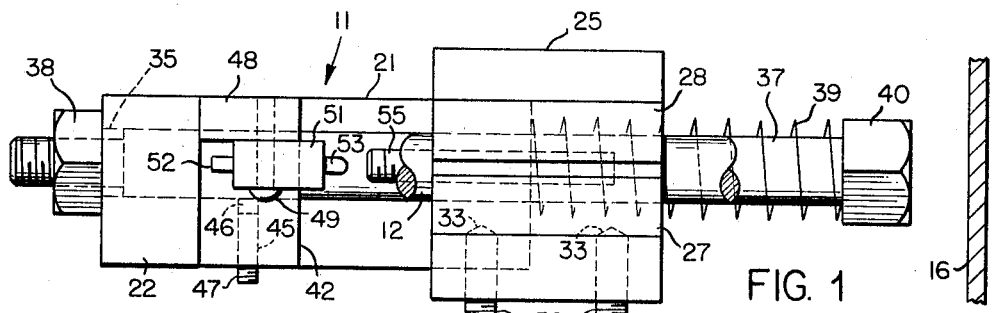
FIG. 1
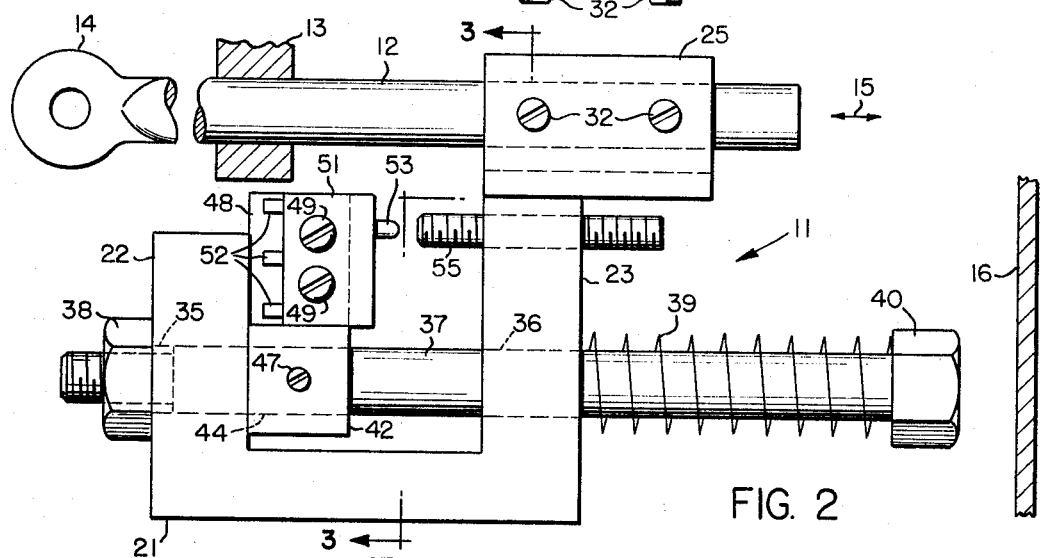
FIG. 2
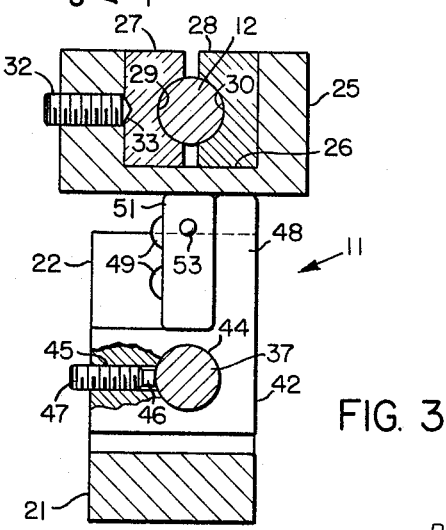
FIG. 3
INVENTOR.
THEODORE W. SPONG
BY
ATTORNEY

United States Patent Office 3,286,056
Patented Nov. 15, 1966

3,286,056
INSTANTANEOUS DECELERATION SIGNAL SWITCH FOR AUTOMOTIVE VEHICLES
Theodore William Spong, 120 Terrace Park, Rochester, N.Y.
Filed Nov. 20, 1964, Ser. No. 412,618
10 Claims. (Cl. 200—61.89)

This invention relates to a warning device for automobiles, trucks, and like vehicles, and more particularly to a signal device for warning that a vehicle is about to be stopped.

The National Safety Council has indicated that one out of every three automobile accidents in this country has involved some type of rear end collision. The increasing volume and pace of today's high speed travel demand faster driver reaction to any and all changes in traffic flow, if such rear end collisions are to be avoided. This is especially true in the case of the "close formation" driving, which is so commonplace on the country's thruways and expressways, when very often only a few feet separates one vehicle from the one immediately preceding it. When a person realizes that at 80 miles per hour an auto is travelling 117 feet per second, it becomes readily apparent that the driver of the trailing vehicle must have excellent reflexes in order to avoid a collision, when the driver of the leading vehicle suddenly brakes. Even at slightly lower speeds, a mere fraction of a second is all that separates the two vehicles.

Heretofore it has been the practice to make the stop lights at the rear of an automotive vehicle responsive to its brake pedal; and the stop lights are energized only after the brake pedal has been depressed a predetermined amount. Therefore, before the driver in a trailing vehicle is alerted by the stop lights at the rear of the preceding vehicle, two distinct functions must have already been performed; namely, the driver in the leading vehicle must have removed his or her foot completely from the accelerator pedal, and must have depressed the vehicle brake pedal far enough to actuate the vehicle's stop lights. Hence, before any signal is given to the driver of the trailing vehicle, the vehicle in front has not only ceased to accelerate, but also has actually begun to brake. There is, therefore, a slight hiatus between the time the leading vehicle begins to decelerate, and the time when its stop lights are actuated. In this slight instant of time, however, if the trailing vehicle is traveling at high speed, a rear end collision can occur.

An object of this invention is to provide a device, which will essentially eliminate the time lapse between the time, when an automotive vehicle commences to decelerate, and when its stop lights are illuminated.

To this end, an object of this invention is to provide a signal device, which is operative automatically to actuate the stop lights of an automotive vehicle the instant the vehicle commences to decelerate.

A more specific object of this invention is to provide a signal device, which is operative within a predetermined speed range of an automotive vehicle, to actuate the vehicle's stop lights the instant the driver releases pressure on the accelerator pedal of the vehicle.

Other objects of the invention will be apparent hereinafter from the specification and from the recital of the appended claims, particularly when read in conjunction with the accompanying drawing.

In the drawing:

FIG. 1 is a plan view of a signal device made in accordance with one embodiment of this invention, part of an automobile fire wall adjacent which the signal device is adapted to be mounted being illustrated fragmentarily;

FIG. 2 is a side elevational view of the signal device, parts of the automobile again being illustrated fragmentarily; and FIG. 3 is a sectional view taken along the line 3—3 in FIG. 2 looking in the direction of the arrows, parts being broken away, and other parts being shown in full.

Referring now to the drawing by numerals of reference, the novel signal device 11 and the actuating mechanism therefor comprises a rod 12, which is slidably mounted intermediate its ends in a stationary bracket 13, that is carried beneath the hood of the automotive vehicle. At one end thereof (the left end in FIG. 2) the rod 12 is provided with a head 14 by means of which it is connected by a conventional linkage (not illustrated) to the vehicle's accelerator for reciprocation thereby in the direction indicated by the arrows 15 in FIG. 2.

The bracket 13 supports the rod 12 so that when the accelerator is depressed or otherwise moved from an idling position in a direction to increase the vehicle's motor speed, the free end of the rod 12 (the right end in FIG. 2) is shifted toward the firewall 16 of the vehicle; and so that when the accelerator is released and returned by the usual accelerator spring (not illustrated), the free end of rod 12 is shifted away from the firewall 16.

Suspended on the rod 12 for reciprocation therewith is a generally U-shaped bracket 21 having a pair of spaced, parallel legs 22 and 23, respectively. The leg 23, is slightly longer than the leg 22, and has integral therewith, or otherwise secured to its upper end a rectangular block 25. Slidably mounted in a rectangular groove 26, which extends between opposite ends of the block 25, is a pair of clamping members 27 and 28. The members 27 and 28 have confronting arcuate faces 29 and 30 (FIG. 3), respectively, which are adapted to grip opposite sides of the rod 12. These surfaces 29 and 30 are forced into a gripping engagement with the rod 12 by a pair of set screws 32, which are threaded into one side of the block 25 so that their inner ends engage recesses 33 formed in the outer side of the clamping member 27. The set screws 32 wedge the members 27 and 28 firmly in the recess 26 in the block 25, and at the same time cause the surfaces 29 and 30 frictionally to grip the rod 12 to secure the bracket 21 against movement on the rod 12.

Slidably mounted intermediate its ends in a pair of registering bores 35 and 36 formed in the bracket legs 22 and 23, respectively, and extending transversely across the space between these legs beneath and parallel to the rod 12, is an elongate bolt 37. The bolt 37 is substantially longer than the width of the bracket 21, and has a nut 38 adjustably threaded onto one end thereof (the left end as illustrated in FIGS. 1 and 2) for engagement with the outer side of the bracket leg 22. Surrounding the opposite end of bolt 37 is a coiled compression spring 39, which at one end abuts the outer side of the bracket leg 23, and which at its opposite end abuts the head 40 of the bolt 37, thereby to urge the bolt 37 resiliently into its extreme right hand position (FIGS. 1 and 2) relative to the bracket 21. In this last-named position, the head 40 of the bolt 37 projects beyond the free or right hand end of the rod 12, so that when the device 11 is mounted in the vehicle as illustrated in FIGS. 1 and 2, and the accelerator is in its idling position, the bolt 40 is disposed in spaced, confronting relation to the firewall or similar stationary surface 16 of the vehicle.

Mounted on the bolt 37 to be guided thereby for reciprocation in the space between the bracket legs 22 and 23 is an L-shaped block 42. Intermediate its ends, the horizontal leg of the block 42 has therethrough a bore 44. Bolt 37 extends slidably through the bore 44, and is frictionally coupled to the block 42 by a resilient plug 46 that slides in a bore 45 in block 42 and is held in frictional engagement with the bolt 37 by a set screw 47 that threads in bore 45. The vertical leg 48 of block 42 has secured to its inside face by screws 49 a normally open microswitch 51. Conventional wire terminals 52 project from the rear of the switch 51; and a spring-loaded actuating plunger 53 projects out of the front face of the switch 51.

Adjustably threaded through the bracket leg 23 to register at its inner end in spaced, confronting relation with the switch plunger 53 is an externally threaded stud or switch actuating member 55. Through terminals 52, the switch 51 is connected in a conventional manner in circuit with the stop lights of the vehicle so that the latter will become energized, when the switch 51 is moved to its closed position by the member 55.

In mounting the device 11 on a vehicle, the bracket 21 is secured to the rod 12 so that a predetermined space will exist between the head 40 of the bolt 37, and the adjacent surface 16 on the vehicle, when the vehicle's accelerator is in its idling position. This adjustment determines the maximum speed at which the vehicle's motor, and hence the speed at which the vehicle itself, may be operated without initiating the operation of the signal device 11. Also, the block 42 is shifted to its extreme left hand position (FIGS. 1 and 2) on the bolt 37, so that the left hand side of the block 42 will abut the inside face of the bracket leg 22, when the bolt 37 is in its extreme right hand position (FIGS. 1 and 2). The switch actuating member 55 is adjusted in the bracket leg 23 so that the inner end of member 55 will be spaced from the switch plunger 53, whereby at this time the switch 51 will be disposed in its open position. The switch is connected in parallel with the usual brake-responsive switch (not illustrated) which is coupled to energize the stop lights of the vehicle when the brake pedal of the vehicle is depressed. Thus, the stop lights will be energized upon the closing either of the switch 51, or of the brake-responsive switch.

When the parts are disposed as illustrated in the drawing, depression of the vehicle's accelerator to increase the motor speed of the vehicle will cause the rod 12, and hence the bracket 21, to be shifted toward the right in FIGS. 1 and 2. Assuming that the device 11 has been adjusted for operation at motor speeds, which correspond under average driving conditions to vehicle speeds above 60 miles per hour, the surface 16 will not be engaged by the bolt head 40 until the accelerator has been depressed a distance corresponding to a vehicle speed of more than 60 miles per hour. If the depression of the accelerator does not exceed this predetermined distance, the bracket 21, the bolt 37, and the block 42 will be reciprocated in unison in response to the movement of the accelerator; and the switch 51 will remain in its open position, with its plunger 53 spaced from the member 55.

However, when the accelerator is depressed to achieve a speed more than sixty miles per hour the rod 12 will be shifted toward the right in FIGS. 1 and 2 a distance sufficient to cause the bolt head 40 to engage the stationary surface 16. This effects a shifting of the bracket 21 toward the right on bolt 37 against the resistance of the spring 39 a distance corresponding to the extent to which the accelerator is depressed beyond its sixty mile per hour position. As the bolt 37 and bracket 21 shift thusly relative to one another, the bracket leg 22 slides the block 42 to the right on the bolt 37, toward the head 40 thereof against the resistance of plug 46. If the accelerator is released, however, to slow the speed of the vehicle, the rod 12 is shifted toward the left in the drawing. During the initial return movement of the rod 12 toward the left, the spring 39 maintains the head 40 of the bolt 37 in engagement with the surface 16, so that the bracket 21 and switch actuating member 55 are shifted to the left on bolt 37, until nut 38 is once again engaged by the bracket leg 22, which will occur when the vehicle speed is reduced to approximately 60 miles per hour. As bracket 21 shifts to the left on bolt 37, the resilient plug 46 holds the block 42 against movement on the bolt 37 until plunger 53 of the switch is engaged by actuator 55, at which time the switch 51 will be closed to energize the vehicle's stop lights.

Normally the space (magnified several times over in the drawing) between the plunger 53 and the actuator 55 is very slight, so that the switch 51 is closed almost the instant the bracket 21 is shifted to the left on bolt 37. As long as the bracket 21 continues to shift toward the left on bolt 37, the resilient plug 36 tends to maintain the plunger 53 in engagement with the member 55, so that the switch 51 remains closed (and the stop lights illuminated) until the movement of the bracket 21 to the left on bolt 37 ceases, e.g., as when the bolt head 40 becomes disengaged from the surface 16, or as when, before the vehicle speed falls below 60 miles per hour, the accelerator is once again depressed to speed up the vehicle, so that the bracket 21 is one again shifted toward the right relative to the bolt 37.

In any event, whenever the movement of bracket 21 toward the left relative to bolt 37 ceases, the tension in the now closed, spring-loaded plunger 53 will, by contact with actuator 55, effect a slight shifting of the block 42 to the left relative to bolt 37, so that the block 42 is moved into abutment with bracket leg 22, thereby permitting the switch 51 to open and deenergize the stop lights of the vehicle.

To assure opening of the switch 51, and to supplement the action of the spring-loaded plunger 53, a light, coiled compression spring may be disposed about the bolt 37 between the block 42 and the bracket leg 23 to assist the return movement of block 42.

From the foregoing it will be apparent that applicant has devised a relatively simple and inexpensive signal device, which will substantially reduce the likelihood of rear end collisions among automotive vehicles. The device will signal instantly to the driver of a trailing vehicle, that the driver in the preceding vehicle has lifted his or her foot from the accelerator pedal. Unlike conventional signal devices of the type that are made to respond to application of a vehicle's brake pedal, applicant's device produces a warning signal to the trailing driver the instant the leading vehicle commences to slow down, thus eliminating the slight delay which would occur if the stop lights were to be energized only after the application of the brake. Moreover, applicant's device is designed to function only at predetermined high speed ranges of vehicle operation, thereby permitting the vehicle's stop lights to be controlled solely by operation of the standard brake-responsive switch, when the vehicle is used for low speed city driving or the like, but affording a combination accelerator-responsive control and brake-responsive control of the vehicle's stop lights, when the vehicle is being operated at high speeds.

The predetermined speed at which the signal device 11 will be made to function can be adjusted by shifting the bracket 21 along the rod 12, thereby to adjust the space between the bolt head 40 and the surface 16, when the accelerator is in its idling position. When this last-named space is decreased, the device 11 will function at lower speeds (for instance 50 miles per hour and above). On the other hand, when the space is increased, the device will not function until higher speeds are achieved, for instance, 70 miles per hour. In any event, the switch 51 will be closed only during the movement of the bracket 21 to the left on bolt 37, which movement can occur only after the bolt head 40 has been shifted far enough to the right initially to contact with the stationary surface 16. At most, therefore, the switch 51 is closed only temporarily following the engagement of its plunger 53 with the actuator member 55.

When a vehicle is being operated at speeds high enough to effect operation of the device 11, the only delay which will occur between the removal of the operator's foot from the accelerator, and operation of the stop lights, will be that afforded by the slight space which normally exists between the plunger 53 and the actuator 55. This delay may be varied by adjusting the position of the actuator 55 relative to the bracket leg 23 either to increase or decrease the space, which exists between the plunger 53 and actuator 55, when the accelerator is in its idling position.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In an automotive vehicle having a reciprocable accelerator and stop lights
   (a) a pair of members,
   (b) means connecting one of said members to the accelerator to reciprocate directly in response to the reciprocation of the accelerator,
   (c) means connecting the other of said members to said one member for movement therewith in one direction, during the movement of said accelerator a predetermined distance in a direction to increase the motor speed of said vehicle, and independently of the force applied to said accelerator, and for movement in the direction opposite to said one direction, and relative to said one member, during the movement of said accelerator beyond said predetermined distance,
   (d) the second-named means including means for returning said other member in said one direction relative to said one member, during the return of said accelerator from beyond said predetermined distance, and
   (e) switch means interposed between said members, and operative momentarily during the return of said other member in said one direction momentarily to energize the stop lights of the vehicle.

2. In an automotive vehicle having a reciprocable accelerator and stop lights
   (a) a pair of members,
   (b) means connecting one of said members to the accelerator to reciprocate in response to the reciprocation of the accelerator,
   (c) means connecting the other of said members to said one member for movement therewith in one direction, during the movement of said accelerator a predetermined distance in a direction to increase the motor speed of said vehicle, and for movement in the direction opposite to said one direction, and relative to said one member, during the movement of said accelerator beyond said predetermined distance,
   (d) the second-named means including means for returning said other member in said one direction relative to said one member, during the return of said accelerator from beyond said predetermined distance, and
   (e) switch means interposed between said members, and operative momentarily during the return of said other member in said one direction momentarily to energize the stop lights of the vehicle, said switch means comprising
   (f) an actuator mounted on said one member for movement therewith,
   (g) a switch movably mounted on said other member to confront said actuator, and to move in unison with said one member and its actuator in said one direction, and
   (h) a friction coupling interposed between said switch and said other member and operative to permit relative movement between said other member and said actuator to close said switch temporarily upon return movement of said other member in said one direction.

3. In an automotive vehicle having a reciprocable accelerator and stop lights,
   (a) a first member mounted on the vehicle and adapted to be connected to the accelerator to reciprocate therewith in response to the advance and return of the accelerator,
   (b) a switch element for controlling the operation of the vehicle's stop lights,
   (c) an actuator element for tripping said switch element to energize said stop lights,
   (d) means mounting said elements on said member for movement therewith in spaced, confronting relation with one another, during the advance of said member with the member in a direction to increase the motor speed of said vehicle, and
   (e) means carried by said member and operative, after said member has advanced a predetermined distance in said direction, and during the initial return movement of said member, to advance one of said elements temporarily into contact with the other element momentarily to energize said stop lights.

4. In an automotive vehicle having a reciprocable accelerator and stop lights,
   (a) a pair of members connected for limited sliding movement relative to one another,
   (b) a spring interposed between said members and holding them in a position of rest relative to one another,
   (c) means connecting one of said members to the vehicle's accelerator for reciprocation therewith, and operative to cause the other of said members to be moved against a stationary surface on said vehicle, and beyond its position of rest against the resistance of said spring, when said accelerator is moved beyond a predetermined distance in a direction to increase the motor speed of the vehicle,
   (d) a switch for energizing the stop lights of the vehicle, and
   (e) means mounting said switch on said other member for movement relative to said one member between a first position in which said switch is open, and a second position in which said switch is closed to energize said stop lights,
   (f) said mounting means including a friction coupling operative to hold said switch in said first position during movement of said other member beyond its rest position, and operative to move said switch temporarily to said second position, upon the return movement of said other member toward its rest position.

5. A device for energizing an electrical warning signal on an automotive vehicle of the type having a reciprocable accelerator for controlling the motor speed of the vehicle, comprising
   (a) a first member having therein a recess,
   (b) a second, reciprocable member extending through said recess,
   (c) a spring interposed between said members to resist movement therebetween, when said second member is moved in one direction relative to said first member,
   (d) a switch mounted to reciprocate in said recess between a first limit position in which it is open, and a second limit position in which it is closed,
   (e) a friction coupling interposed between said switch and one of said members to hold said switch in said first limit position during the movement of said second member in said one direction, and operative to permit movement of said switch to said second position, during the movement of said second member in the opposite direction, (f) means connecting said first member to the accelerator to effect movement of said second member in said one direction only after said accelerator has been moved a predetermined distance in a direction to increase the motor speed of the vehicle, and
(g) means connecting said switch to an electrical warning signal on said vehicle to energize said signal when said switch is closed.

6. A device for operating the stop lights of an automotive vehicle of the type having a reciprocable accelerator, which is movable to control the speed of the vehicle, comprising
(a) a first member,
(b) means connecting said first member to the accelerator for reciprocation thereby toward a stationary surface on the vehicle, when said accelerator is moved in a direction to increase the vehicle's speed, and away from said surface, when said accelerator is moved in a direction to reduce speed,
(c) a second member reciprocably mounted on said first member,
(d) a spring interposed between said members resiliently to urge said second member toward a limit position in which one end thereof projects beyond said first member in spaced, confronting relation to said surface, said second member being engageable by said surface for movement thereby relative to said first member against the resistance of said spring, when said accelerator is moved to increase the speed of the vehicle beyond a predetermined speed,
(e) a normally open switch operative, when closed, to energize the stop lights of the vehicle,
(f) means mounting said switch on said second member for movement relative thereto in the direction of said surface by said first member, when said second member is moved against the resistance of said spring, and
(g) a switch actuator mounted on said first member and engageable with said switch to return it in the opposite direction relative to said second member, during the return of said second member to its limit position,
(h) the last-named means including a friction coupling operative to resist the initial movement of said switch in said opposite direction, thereby to hold said switch stationary relative to said actuator to effect temporary closing of said switch by said actuator during the movement of said second member back to its limit position.

7. A device as defined in claim 6, wherein the first-named means includes means for adjusting the distance between said one end of said second member and said surface.

8. A device as defined in claim 6, including means for adjusting said friction coupling to adjust the length of time said switch is closed by said actuator.

9. A device for operating the stop lights of an automotive vehicle of the type having a reciprocable accelerator, which is movable to increase the motor speed of the vehicle, comprising
(a) a generally U-shaped member having spaced, parallel legs,
(b) a rod reciprocably mounted on said member and extending transversely through the legs of said member,
(c) a bracket slidably mounted on said rod between said legs,
(d) a resilient carried by said bracket and frictionally engaging said rod to couple said bracket frictionally to said rod,
(e) a switch actuating member projecting from one of said legs into the space between said legs,
(f) a switch secured to said bracket and having a spring-loaded plunger movable to close said switch and actuate the stop lights,
(g) a spring interposed between the first-named member and said rod to urge the latter to a first limit position, in which one end of said rod projects beyond said first-named member, and
(h) means connecting said first-named member to the vehicle's accelerator for reciprocation thereby to move said rod toward and away from a stationary surface on the vehicle, whereby said one end of said rod is spaced from said surface, when said accelerator is in idling position, and is pressed against said surface, when said accelerator is moved to effect operation of said vehicle beyond a predetermined speed thereby to effect movement of said rod away from said first limit position,
(i) said resilient member being operative temporarily to hold said bracket frictionally against movement on said rod, upon the return movement of said rod to said first limit position, whereby said actuating member effects momentary closing of said switch upon said return movement.

10. A device for operating the stop lights of an automotive vehicle of the type having a reciprocable accelerator, which is movable in one direction to increase the motor speed of the vehicle and in the opposite direction to decrease the motor speed, comprising
(a) a first rod mounted in a vehicle to reciprocate axially and connected to the vehicle's accelerator for movement thereby,
(b) a generally U-shaped member having a pair of spaced, parallel legs,
(c) a second rod reciprocably mounted in said member and extending transversely through said legs,
(d) a spring interposed between said member and said second rod to urge the latter in one direction,
(e) means mounting said member on said first rod for reciprocation therewith, the vehicle having a stationary surface against which one end of said second rod abuts when said first rod is moved in one direction, by acceleration of the motor speed, beyond a predetermined point,
(f) a switch actuator projecting from one of said legs into the space between said legs,
(g) a switch reciprocably mounted on said second rod between said legs and having a spring-loaded plunger normally spaced from said actuator,
(h) said spring being compressed upon further movement of said first rod in said one direction of its movement, and being operative upon deceleration of said motor to bring said actuator into engagement with said switch plunger to close said switch and actuate the vehicle's stop lights,
(i) a friction coupling connecting said second rod and said switch and frictionally resisting the return movement of said switch with said second rod when said second rod moves again with said first rod in said one direction, whereby said plunger shifts said switch on said second rod back to position spaced from said actuator.

References Cited by the Examiner
UNITED STATES PATENTS

| | | | |
|---|---|---|---|
| 2,716,678 | 8/1955 | Randol | 200—61.89 |
| 2,734,105 | 2/1956 | Perry | 200—86.5 |
| 3,103,561 | 9/1963 | Chesler | 200—61.89 |
| 3,105,884 | 10/1963 | Cottrell | 200—61.89 |
| 3,219,775 | 11/1965 | Carpenter | 200—61.89 |

BERNARD A. GILHEANY, *Primary Examiner.*

J. J. BAKER, *Assistant Examiner.*